United States Patent
Starling et al.

(10) Patent No.: US 8,606,751 B1
(45) Date of Patent: Dec. 10, 2013

(54) SYSTEM AND METHOD FOR BACKUP BY INODE NUMBER

(75) Inventors: Jennifer Starling, Lake Forest, CA (US); Scott Ogata, Lake Forest, CA (US); Emile Snyder, Talent, OR (US); Scott Dolim, Trabuco Canyon, CA (US); Scott Auchmoody, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 541 days.

(21) Appl. No.: 12/643,109

(22) Filed: Dec. 21, 2009

(51) Int. Cl.
*G06F 7/00* (2006.01)
*G06F 17/00* (2006.01)

(52) U.S. Cl.
USPC .......................................... 707/634; 707/640

(58) Field of Classification Search
None
See application file for complete search history.

(56) References Cited

U.S. PATENT DOCUMENTS

| | | | |
|---|---|---|---|
| 7,039,663 B1 * | 5/2006 | Federwisch et al. | 1/1 |
| 7,475,098 B2 * | 1/2009 | Patterson et al. | 1/1 |
| 7,593,938 B2 * | 9/2009 | Lemar et al. | 1/1 |
| 7,739,318 B2 * | 6/2010 | Zayas et al. | 707/823 |
| 7,769,719 B2 * | 8/2010 | Everhart | 707/651 |
| 2002/0049726 A1 * | 4/2002 | Cork et al. | 707/1 |
| 2003/0074378 A1 * | 4/2003 | Midgley et al. | 707/204 |
| 2003/0195903 A1 * | 10/2003 | Manley et al. | 707/201 |
| 2004/0267822 A1 * | 12/2004 | Curran et al. | 707/200 |
| 2004/0267838 A1 * | 12/2004 | Curran et al. | 707/204 |
| 2006/0112151 A1 * | 5/2006 | Manley et al. | 707/201 |
| 2007/0094269 A1 * | 4/2007 | Mikesell et al. | 707/10 |
| 2008/0154978 A1 * | 6/2008 | Lemar et al. | 707/201 |
| 2008/0201366 A1 * | 8/2008 | Devarakonda et al. | 707/103 Y |
| 2009/0177718 A1 * | 7/2009 | Patterson et al. | 707/204 |
| 2009/0271456 A1 * | 10/2009 | Kushwah | 707/204 |

* cited by examiner

*Primary Examiner* — Tony Mahmoudi
*Assistant Examiner* — Tuan A Pham
(74) *Attorney, Agent, or Firm* — Dergosits & Noah LLP; Todd A. Noah

(57) ABSTRACT

This disclosure is describes a system and method for organizing and storing backup data by inode number. Data objects on a file system may be streamed to a backup client that identifies the inode numbers for each streamed data object before streaming the objects to storage. The inode numbers are parsed to create one or more inode directories that can be browsed during a recovery process. In this fashion, the file system can be quickly backed up without requiring the backup client to determine the file system's directory hierarchy.

5 Claims, 5 Drawing Sheets

SYSTEM AND METHOD FOR BACKUP BY INODE NUMBER

FIELD

This disclosure relates generally to data backup, and specifically, to the management of data objects backed up using the dump command or the equivalent.

BACKGROUND

Current methods for the backup and recovery of data objects stored in a file system typically involve transmitting, or "streaming" data objects from the file system through a network, then writing the streamed objects to tape or disk storage media ("backup storage"). A backup and recovery application ("BURA") running on a backup client may help manage the backup process, as well as the recovery process in the event a backed up data object needs to be restored. The backup client running the may be a node, server or other computing device that also provides the hardware and memory for processing data objects during the backup process.

During the backup process, the BURA will often identify the path information or "hierarchy" for the data object as it originally resided on the file system. This information may be found in metadata associated with each data object. The BURA can direct storage and use of this information to create and display a directory tree resembling the file system, except that data objects shown in the directory tree will be mapped to their locations in backup storage rather than their locations in the original file system. The directory tree eases browsing of the backup storage to identify and located data objects for recovery. However, when data objects are backed up, they are not organized according to their original path addresses. Data objects are streamed to backup in a seemingly random order. As such, the BURA must parse the streamed data objects to identify each path address, then store this information in memory associated with the BURA. In most cases, this information is stored in the memory for the backup client. For large file systems, the backup client will require large amounts of memory for processing and creating a directory hierarchy for the backed up data objects. In addition, the time required for processing and storing path information, as well as creating the directory hierarchy can greatly slow the backup process and can strain network resources.

What is therefore needed is a way to optimize the backup process and reduce the strain on backup and recovery resources. What is needed is a way to reduce the amount of processing required by the backup and recovery application.

BRIEF DESCRIPTION OF THE FIGURES

Embodiments of this disclosure are illustrated by way of example and not limitation in the figures of the accompanying drawings, in which like references indicate similar elements, and in which.

DETAILED DESCRIPTION

Figure 1:
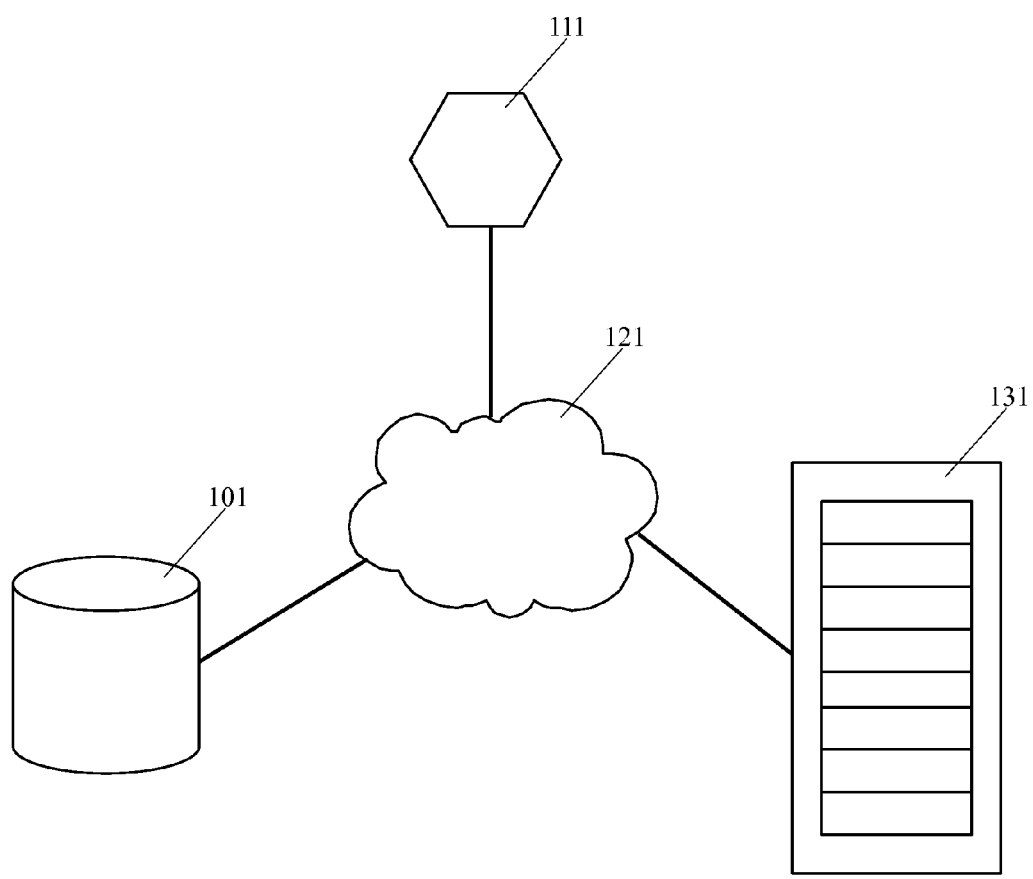
FIG. 1 is an exemplary block diagram depicting a system embodiment of the disclosure.

Disclosed herein is a system and method for streamlining the backup process by minimally processing streamed data objects from a source file system to a destination backup storage by a backup client. An embodiment of this disclosure provides a way to backup a source file system by referring to the file system's data objects by inode number rather than by the data objects' names. One having ordinary skill in the art will appreciate that a file system typically assigns or associates an inode number to a data object when the data object is created, and may represent the inode for the data object. An inode number may be a 32-bit string, hexadecimal string, integer or other sortable identifier. One will also appreciate that a user or application may refer to a data object by name, whereas a file system may refer to the data object by inode or inode number. As will be discussed further below, referring to the inode numbers of backed up data objects reduces the amount of memory and resources required by the backup client managing the backup process.

It should be appreciated that an embodiment can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing an embodiment. Applications may also be downloaded in whole or in part through the use of a software development kit or toolkit that enables the creation and implementation of an embodiment. In this specification, these implementations, or any other form that an embodiment may take, may be referred to as techniques. In general, the order of the steps of disclosed processes may be altered within the scope of this disclosure.

FIG. 1 is a block diagram illustrating an embodiment of a system for backing up data objects organized by inode number. In FIG. 1, NAS 101 is the source file system storing data objects for backup, which may include data files, data directories or any binary large object ("BLOB") having inodes and inode numbers. In the examples discussed herein, NAS 101 may be a network attached storage ("NAS") device, also known as a filer or networked storage appliance that stores data objects organized into files and directories, or by content address. NAS 101 may be a computer, a server, or any device that stores data objects. NAS 101 may be Unix-based or may run a Unix-variant operating system (such as Apple OSX®, Linux or the like), and each data object, i.e., each file and each directory, has an inode represented by an inode number. NAS 101 may run a non-Unix based operating system, such as Microsoft Windows OS®, so long as each data object selected for backup may be represented or referred to by inode number.

In FIG. 1, backup client 111 is a computer, application or node that communicates with NAS 101 to manage the backup of data objects from NAS 101. Backup client 111 may run a BURA that receives and reacts to instructions for the backup and recovery of selected data objects. In an embodiment, backup client 111 is a BURA that can be run on or by NAS 101. In the examples given herein, actions performed on or by backup client 111 may be performed by the BURA on backup client 111. In an embodiment, backup client 111 is NDMP-compatible.

Backup storage 131 may be disk storage or other long-term storage. Data objects selected for backup may be streamed by backup client 111 to backup storage 131. One will appreciate that backup storage 131 may be a server or other computing device, and may have sufficient processing and memory for receiving and storing data objects. As such, reference to backup storage 131 may refer to the computing resources as well as the storage media responsible for the long-term storage of backed up data objects.

NAS 101, backup client 111 and backup storage 131 may communicate with each other over network 121. In an embodiment, the components in FIG. 1 may form part of a storage area network ("SAN"). In an embodiment, NAS 101 or backup storage 131 may be content addressed storage ("CAS"), and data objects may be identified by hash or content addresses, in addition to inode number. One of ordinary skill in the art will appreciate that a content address is a hash of the content or portions ("chunks") of the content of a data object, whereas an inode number refers to the data object itself.

One skilled in the art will appreciate that the components illustrated in FIG. 1 are merely exemplary, and that other configurations are possible without departing from this disclosure or the scope of an embodiment. For example, while backup client 111 is shown separately from NAS 101, one will appreciate that it is possible for a backup client 111 to reside as an application on NAS 101 for locally managing the backup and recovery process. In this embodiment, backup client 111 may not be physically separate from NAS 101 on network 121. In addition, the stream of data objects may travel from NAS 101 to backup storage 131 without passing through a separate backup client 111.

In an embodiment, the backup process may be initiated using the "dump" command, which will typically cause a backup of all the data objects in a file system. The dump command may be issued by a user, an administrator, or anyone having the appropriate permissions for authorizing a backup process. In an embodiment, the dump command or similar backup process may be part of a regularly scheduled backup process that periodically backs up the file system. A person having ordinary skill in the art will appreciate that in response to the dump command, the resulting stream of data objects from the file system to the backup client and then to backup storage is called a "dump stream" or "dump data stream."

One having ordinary skill in the art will appreciate that in addition to the data objects being backed up, a typical dump stream may include or be preceded by one or more header records, portions of header records, metadata or other information about the data objects in the dump stream. For example, there may be a portion of a header record called "TS_BITS" that contains a bitmap of the inodes in the dump stream. There may be a portion called "TS_CLRI" that contains a bitmap of the inodes deleted or empty since the last backup process was performed using the dump command. The TS_CLRI bitmap may be significant during an incremental backup process rather than the full backup process. Another portion that may be found in a dump stream includes a list or record of the directories and the contents of the directories for backup from the source file system. In addition, the dump stream may include a list of file metadata and data or file content associated with each data object for backup. The dump stream may also include metadata or a list pertaining to the "access controls" for the data objects being backed up. This metadata or list may be referred to as "ACLs." The dump stream may also contain a header record that lists the inode numbers for the data files in a particular data directory on NAS 101. In addition to the portions listed herein, the dump stream may include other data, or the portions may be labeled differently or combined with other portions. One of ordinary skill will appreciate that the dump stream may contain all, one or some of the portions described herein. One will appreciate that the dump stream described herein is merely exemplary and not intended to limit an embodiment or disclosure to any one dump stream or file stream format.

As discussed above, current backup processes will parse the dump stream to identify the path addresses for each of the data objects being backed up in order to create a directory hierarchy that reflects the source file system. However, dump stream objects are typically transmitted in an inode-sorted order, which may be unrelated to the data objects' path addresses. One will appreciate that an inode-sorted dump stream does not necessarily group data files from the same directory. In fact, the dump stream objects may virtually be in random order or in the order the data objects were created on the source file system. In these circumstances, parsing and identifying path address information for each data object will be tedious and memory-intensive, since it will require tracking the name of each directory and contents of each directory, confirming that the directory and its contents have been selected for backup, then mapping each backed up data object's location in backup storage. Due to the large size of most file systems, as well as the directories and sub-directories commonly found in each file system, the processing required during a backup can strain memory and network resources.

Figure 2:
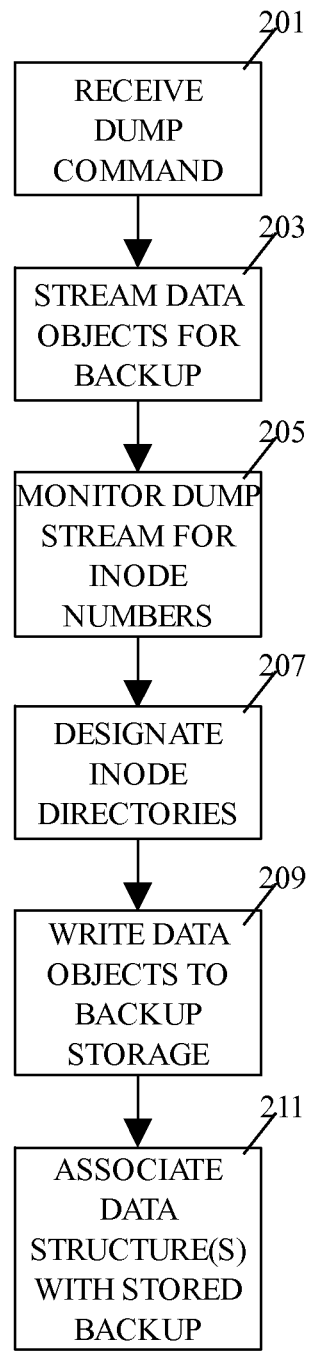
FIG. 2 is an exemplary flow diagram of a full backup process, according to an embodiment of the disclosure.

In order to reduce the amount of and memory processing as required by current methods, an embodiment will not involve as much parsing of the dump stream. Instead, data objects may be grouped by inode number, without regard to whether a data object is a data file or directory, or whether the object is data file located in a particular directory or sub-directory. FIG. 2 illustrates an embodiment in which backed up data objects are grouped by inode number as part of a full or "level 0" backup of the file system for NAS 101. One will appreciate that variations of the following process are also possible, and that the following process is merely exemplary and not intended to limit this disclosure or an embodiment to any one method.

In block 201 of FIG. 2, backup client 111 receives a dump command from an administrator or user with sufficient permissions. In block 203, backup client 111 responds to the dump command by gathering and facilitating the streaming of the file system and file system data objects on source NAS 101 to backup client 111. In block 205, backup client 111 monitors the dump stream to track the inode numbers for the data objects being backed up. Backup client 111 may read the inode numbers as the data objects are streamed by referring to a header record, metadata or other portion of the dump stream that lists all of the inode numbers for the data objects in the dump stream.

In block 207, backup client 111 may designate a range of inode numbers as belonging to a directory, called an "inode directory." The quantity of inode numbers included in the range may be selected based upon the memory available to backup client 111. Inode directories will be discussed further below, and are distinguishable from the directory hierarchy or hierarchical directory that may exist on NAS 101.

In block 209, data objects may be streamed and written to backup storage 131 in the order that they are streamed from the source NAS 101, i.e. inode-sorted order. In block 211, backup client 111 may associate one or more data structures with the data objects written to backup storage 131 in block 209. A person of ordinary skill in the art will appreciate that the one or more data structures may be a data table, database, bitmap, tree, metadata, list, record, file, bitmap or other object storing or representing data. The one or more data structures may include a list of the inode numbers for the data objects written to backup storage 131, as well as the file names for the written data objects. For example, the file system for NAS 101 may be fully backed up as a backup image, and in block 211, all of the inode numbers for the data objects contained in the backup image may be stored in a first data structure and associated with the backup image. In an embodiment, there may be a second data structure that reconciles the inode numbers with the data object names. This data structure may also be part of the header record associated with the dump stream, and may be organized as a directory hierarchy as it exists in NAS 101. For example, the data structure may be a table that lists all of the data files in a certain hierarchical directory, as well as the inode numbers for the data files. Each directory in NAS 101 may have a similar entry that lists the directory name, the data files in the directory, and the inode numbers for the data files in that directory. As will be discussed further below, the two data structures may aid in the recovery of data objects from backup storage 131.

The inode directories mentioned above may provide a way to locate backed up data objects in backup storage without requiring the memory-intensive processing required in current backup methods. As previously mentioned, backup client 111 may designate one or more ranges of inode numbers into inode directories during the back up process (block 207 of FIG. 2), rather than adopting hierarchical directories typically used in current backup methods. For example, NAS 101 may store twenty (20) data objects labeled inode numbers f1000 to f1019, which may be streamed in inode-sorted order to backup client 111. In other words, a read of the dump stream (or dump stream header records) may identify data objects streaming in the following order: f1000, f1001, f1002 . . . f1017, f1018, f1019. One will appreciate that f1000 may differ in size from f1001, or f1001 may be a data file while f1002 is a data directory, etc. According to an embodiment, these distinctions may not be considered by backup client 111 during the backup process. Instead, in block 207 of FIG. 2, backup client may designate inode numbers f1000 to f1004 as belonging to inode directory dir1000, inode numbers f1005 to f1009 belonging to dir1005, f1010 to f1014 belonging to dir1010 and f1015 to f1019 belonging to dir1015. As a result, backup client 111 may designate five inode directories, with each inode directory containing five data objects sorted by their inode numbers. One will appreciate that dir1000 may differ in size from dir1005, and that dir1010 may contain data objects that are completely unrelated to one another. These distinctions may not affect the backup process illustrated in FIG. 2 and described herein. A list of the inode directories may be stored in memory associated with and/or accessible by backup client 111 (block 211 of FIG. 2). This list may later be written to backup storage 131 in one or more data structures, as previously mentioned.

In the previous example, the inode numbers are consecutively incremented by a value of one (1), e.g. f1000, f1001, etc. One having ordinary skill in the art may recognize that inode numbers may not increment but a single digit or value, and that there may be gaps between consecutive inode numbers. The previous example merely illustrates how inode directories may be created and organized. Further, one will appreciate that creating the names for inode directories may not follow the naming convention as previously described. The following example may describe a more typical embodiment.

Figure 3:
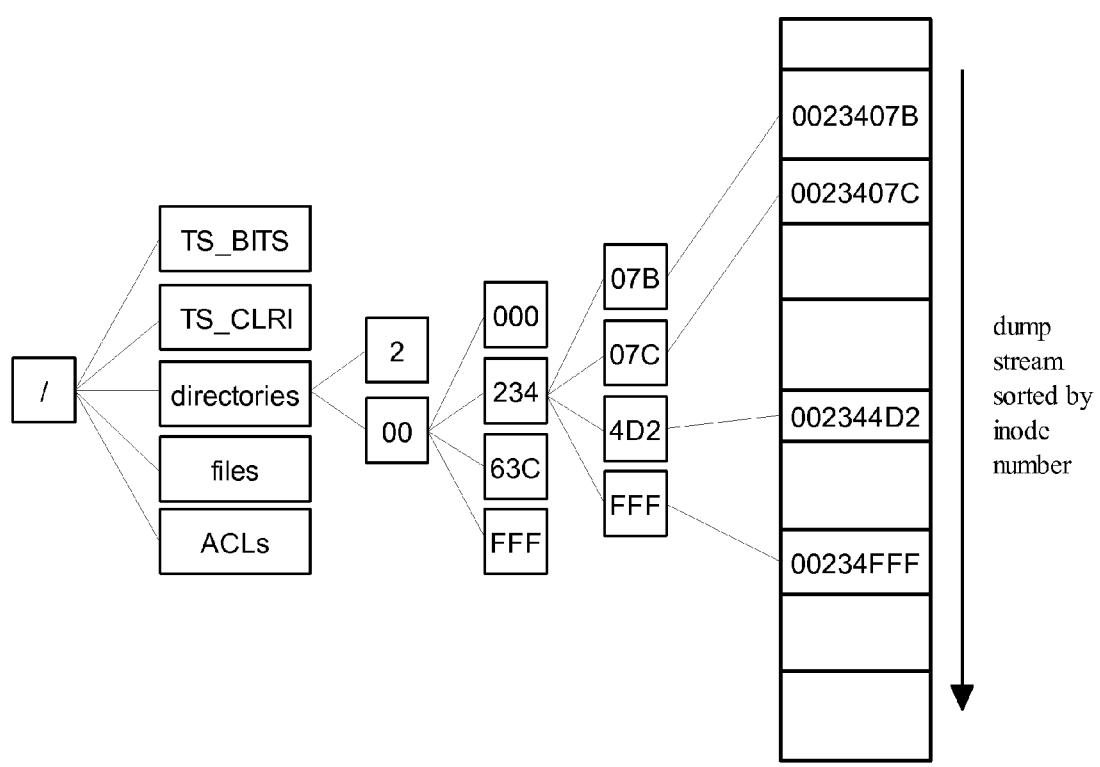
FIG. 3 is an exemplary block diagram depicting an embodiment of the disclosure.

In an embodiment, inode numbers may be 32 bits, which may be converted into hexadecimal format. Rather than creating new names for designated inode directories, backup client 111 (or the BURA) may separate the hexadecimal inode number digits and organize inode numbers accordingly. By separating out series of digits from the hexadecimal inode number, backup client 111 may simulate a hierarchical directory structure with directories and sub-directories, without actually creating one or without adopting the hierarchical directory structure of the source file system. In an example, the dump stream may contain inode numbers 00223407B, 0023407C, 002344D2 and 00234FFF, each inode number corresponding to a backed up data object. By identifying the last few digits of the inode number, backup client 111 may designate object 0023407B as belonging to inode directory 07B, and 0023407C may belong to inode directory 07C. Similarly, object 002344D2 may belong to inode directory 4D2 and object 00234FFF may belong to inode directory FFF. In an embodiment, the last few digits of the inode number may be treated as an identifier for the backed up data object, such that 07B may be refer to the contents or BLOB for 0023407C, 4D2 may refer to the contents or BLOB for 002344D2, and FFF may refer to the contents or BLOB for 00234FFF, One will appreciate that the preceding few digits in each object's inode number may be similar. In the present example, each inode number contains the next few digits, "234." In this circumstance, backup client 111 may designate each of the four directories (07B, 07C, 4D2 and FFF) as belonging to an inode directory 234. In other words, inode directory 234 may "contain" inode directories 07B, 07C, 4D2 and FFF, which in turn may "contain" the inode numbers and therefore, may refer to the data objects listed above. In addition, as illustrated in the preceding example, each inode number begins with the two digits 00; therefore, the 234 inode directory may in turn be designated as belonging to an inode directory 00. As will be discussed further below, by designating inode directories and organizing data objects by inode number, backup client 111 may quickly locate backed up data objects stored in backup storage 131. FIG. 3 is a block diagram of an inode directory tree illustrating this example.

As discussed previously, inode directories may differ from the directory hierarchy or hierarchical directories present on NAS 101. In an embodiment, inode directories may be designated by backup client 111 in order to populate one or more data structures to aid in locating backed up data objects for recovery. One will appreciate that designating ranges of inode numbers into inode directories does not necessarily mean that backup up data objects are actually stored in hierarchical directories and sub-directories created by the backup client 111.

In an embodiment, backup storage 131 may be a content addressed storage that stores backed up data objects as BLOBs labeled with each BLOB's unique content address, which may be created by applying a hash function in accordance with conventional methods for generating or calculating content addresses. In this embodiment, backup storage 131 may contains a single flat directory or hash directory with no directory hierarchy.

Figure 4:
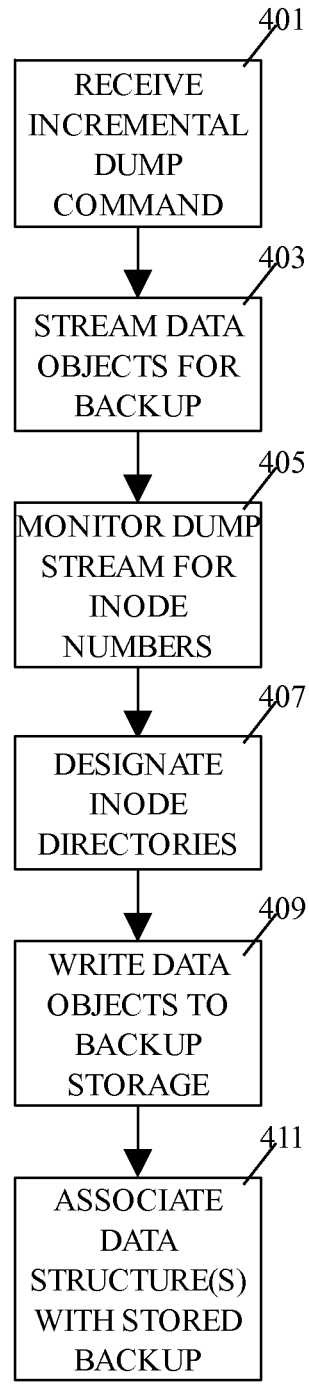
FIG. 4 is an exemplary flow diagram of an incremental backup process, according to an embodiment of the disclosure.

As mentioned above, FIG. 2 illustrates a full or level 0 backup. FIG. 4 is a flow diagram of an incremental or "level 1" backup, which is a backup of only those data objects that have changed or have been created since the previous backup process. In block 401, backup client 111 may receive a level 1 dump command to perform an incremental backup of the data objects stored in NAS 101. In block 403, backup client 111 may receive and respond to the dump command by gathering and facilitating the streaming of the new or changed data objects on source NAS 101 to backup client 111. Backup client 111 may apply conventional methods for determining which data objects should be backed up, which may include reviewing metadata or record header data about the data objects in NAS 101 to discover which data objects are new or different from the previous backup. In an embodiment, backup client 111 may be selecting specific data directories or individual data files for backup. In an embodiment, NAS 101 is a computing device running a Microsoft Windows® operating system, an Apple OSX® operating system, a Linux operating system, or the like. In an embodiment, NAS 101 is a content addressed storage system, and backup client 111 determines whether the content has changed for a data object by referring to its content address. In an embodiment, backup client 111 merges the inode numbers from NAS 101 with inode numbers from a previous backup process stored on backup storage 131. Backup client 111 may perform this embodiment in order to compare the inode numbers between current and previous backup processes. For example, backup client 111 may compare the inode numbers between current and previous backup processes to determine if any of the inode numbers have changed. One will appreciate that other methods may be applied to facilitate backup of a portion of NAS 101, and that the examples given herein are not meant to limit this disclosure or the scope of an embodiment.

In block 405, backup client 111 may monitor the dump stream to track the inode numbers for the data objects being backed up. This may involve reading the inode numbers as the data objects are streamed or referring to a header record or other portion of the dump stream that lists all of the inode numbers for the data objects in the dump stream. In block 407, backup client 111 may designate a range of inode numbers as belonging to an inode directory, as was previously discussed. In block 409, data objects may be streamed and written to backup storage 131 in the order that they are streamed from the source NAS 101, i.e. inode-sorted order. In block 411, backup client 111 may associate one or more data structures with the inode numbers and names for the data objects streamed to backup storage 131. For example, a first data structure may include the inode numbers for the data objects streamed to backup storage 131, and a second data structure may reconcile the inode numbers with the name or other identifier for the data object. The one or more data structures may be a data table, database, bitmap, tree, metadata, list, record, file, bitmap or other object storing or representing data.

As illustrated in FIG. 4 and described above, an embodiment streamlines both full and incremental backup processes. One will appreciate that using conventional methods known in the art, a backup image from an incremental backup process, or the backup images from a series of consecutive incremental backup processes may be combined to generate what could have resulted from a full backup process. In this fashion, a user can refer to a backup image that represents a file system as it existed at a certain point in time or after a certain backup process. A person having skill in the art will appreciate that the use of incremental backup processes shortens the backup process since there is no need to perform a full backup if less than the entire file system has changed.

One will appreciate that backup client 111 may perform recovery (or a "restore") of the backed up file system as well. A full restore of the backup image stored in backup storage 131 may apply conventional methods, which may include a stream of the entire backup image to NAS 101. However, if certain data objects are requested, then backup client 111 may require a lookup of the requested data objects by referring to the header records or metadata associated with the backup image that includes the requested data objects. One having ordinary skill in the art will appreciate that the backup client 111 may refer to backed up data objects by inode number, by name or other identifier.

Figure 5:
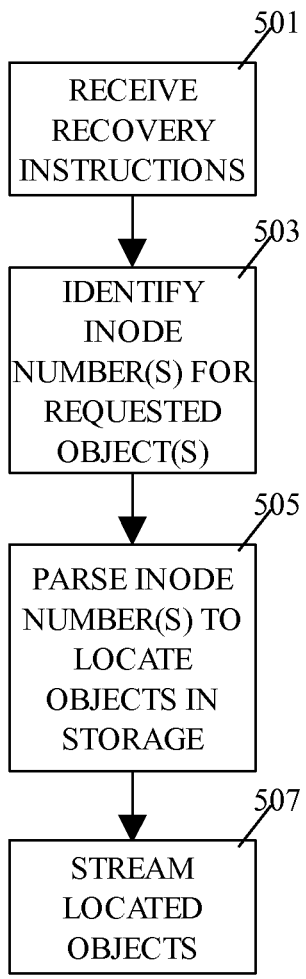
FIG. 5 is an exemplary flow diagram of a recovery process, according to an embodiment of the disclosure.

FIG. 5 is a flowchart illustrating a sub-volume restore process, which is a recovery of less than a full backup image, or less than a complete file system volume. In block 501, backup client 111 receives instructions or a restore command to recover certain identified data objects, which may include specific data files or data directories. The instructions may request data objects from a specific backup image. In an embodiment, the instructions include the names of the requested data objects, and backup client 111 will need to identify the inode numbers for the requested data objects in order to locate them in backup storage 131. In an embodiment, the restore command may refer to the requested data objects by inode number, in which case backup client 111 may skip to block 505 discussed further below.

In block 503, backup client 111 refers to the one or more data structures associated with the backup image identified in the instructions. Backup client 111 will be able to search the one or more data structures to identify the inode numbers for the requested data objects. Once backup client 111 identifies the inode number for the requested data objects, backup client 111 can separate the digits of the inode number to determine the inode directory, and therefore approximate location of the requested data objects in backup storage 131 (block 505). In block 507, the located data objects are streamed to a location identified in the recovery instructions.

In the description above and throughout, numerous specific details are set forth in order to provide a thorough understanding of an embodiment. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. One will appreciate that these steps are merely exemplary and are not meant to be limiting in any way. Other steps and functions may be contemplated without departing from this disclosure or the scope of an embodiment.

What is claimed is:

1. A method for backing up data objects from a file system to a backup medium, comprising:

monitoring, during a backup process, a data stream from a file system, the data stream comprising a plurality of data objects to be backed up and comprising information about the data objects, wherein each of the plurality of data objects is associated with an inode number and the data is streamed sorted by the associated inode number;

creating a plurality of inode directories from the monitored data stream, each inode directory comprising a range of inode numbers and at least some of the information about each data object in the range, wherein each of the plurality of inode directories refers to an equal quantity of associated inode numbers;

creating a data structure storing the plurality of inode directories;

writing the plurality of data objects from the data stream to the backup medium; and, writing the data structure to the backup medium, wherein upon receipt of a request for one of the plurality of data objects written to the backup medium, the request including information about the requested data object, the data structure is used to locate backed up data objects stored in the backup medium by matching, in the data structure, information about the requested data object with the inode number for the requested data object.

2. The method of claim 1, further comprising:

generating a content address for each of the streamed data objects prior to writing the data objects to the backup medium.

3. A computer program product, comprising a non-transitory computer usable medium having a computer readable program code embodied therein, the computer readable program code adapted to be executed to implement a method for backing up data objects from a file system to a backup medium, comprising:

monitoring a data stream from a file system, the data stream comprising a plurality of data objects on the file system to be backed up and comprising information about the data objects, wherein each of the plurality of data objects is associated with an inode number and the data is streamed sorted by the associated inode number;

creating a plurality of inode directories from the monitored data stream, each inode directory comprising a range of inode numbers and at least some of the information about each data object in the range, wherein each of the plurality of inode directories refers to an equal quantity of associated inode numbers;

creating a data structure storing the plurality of inode directories;

writing the plurality of data objects from the data stream to the backup medium; and, writing the data structure to the backup medium, wherein upon receipt of a request for one of the plurality of data objects written to the backup medium, the request including information about the requested data object, the data structure is used to locate backed up data objects stored in the backup medium by matching, in the data structure, information about the requested data object with the inode number for the requested data object.

4. The computer program product of claim 3, further comprising:

generating a content address for each of the streamed data objects prior to writing the data objects to the backup medium.

5. The computer program product of claim 3, further comprising:

transmitting the requested data object to a file system.

* * * * *